United States Patent
Kutka

(10) Patent No.: US 7,634,009 B2
(45) Date of Patent: Dec. 15, 2009

(54) METHOD AND DEVICE FOR PICTURE COMPRESSION USING A PLURALITY OF SAMPLING PATTERNS

(75) Inventor: Robert Kutka, Geltendorf (DE)

(73) Assignee: Infineon Technologies AG, Munich (DE)

( * ) Notice: Subject to any disclaimer, the term of this patent is extended or adjusted under 35 U.S.C. 154(b) by 1096 days.

(21) Appl. No.: 09/957,629

(22) Filed: Sep. 20, 2001

(65) Prior Publication Data

US 2002/0071487 A1 Jun. 13, 2002

(30) Foreign Application Priority Data

Sep. 21, 2000 (DE) ................................ 100 46 807

(51) Int. Cl.
*H04N 7/12* (2006.01)

(52) U.S. Cl. ................................ 375/240.21

(58) Field of Classification Search ............ 375/240.02, 375/240.03, 240.21, 240.24, 240.16; 348/452; *H04N 7/12*
See application file for complete search history.

(56) References Cited

U.S. PATENT DOCUMENTS 5,210,605 A * 5/1993 Zaccarin et al. ........ 375/240.16
5,682,205 A * 10/1997 Sezan et al. .................. 348/452
6,100,932 A   8/2000 Boyce et al. ................. 348/416
6,704,358 B1 * 3/2004 Li et al. .................. 375/240.02

FOREIGN PATENT DOCUMENTS

EP      0 710 026 A2    5/1996

OTHER PUBLICATIONS

Rabbani et al., Digital Image Compression Techniques, pp. 192-193 and 199-202 (1991).
Patent Abstracts of Japan, Publication No. JP 10257502 A.

* cited by examiner

*Primary Examiner*—Young Lee
(74) *Attorney, Agent, or Firm*—Peter F. Corless; Steven M. Jensen; Edwards Angell Palmer & Dodge LLP

(57) ABSTRACT

In order to realize effective picture compression without significantly impairing the resolution, it is proposed that the picture to be compressed be subdivided into a plurality of picture areas, for example into picture blocks each having 16×16 pixels, and the picture areas be subdivided into a plurality of layers, in particular into three layers, which correspond to different sampling patterns. The pixels (13-15) of a layer are in each case predicted from adjacent pixels of the other layers, in particular of the already previously processed and coded layers, the prediction area being coded. The invention is suitable in particular for use in video coders or video decoders with motion-compensated prediction, in order to compress the reference picture to be stored in a reference picture memory (5).

26 Claims, 2 Drawing Sheets

- Layer 1
- Layer 2
- Layer 3

METHOD AND DEVICE FOR PICTURE COMPRESSION USING A PLURALITY OF SAMPLING PATTERNS

BACKGROUND OF THE INVENTION

The present invention relates to a method for picture compression, as can be used for example in video or TV coders or decoders with motion-compensated prediction, and also to a corresponding device for picture compression.

Future digital TV decoders shall be able to receive not only the CCIR or PAL picture format but also high resolution signals, so-called HDTV signals (High Density Television), and to reproduce them in a reduced size on conventional screens. One problem in the decoding of high resolution video signals is the enormous memory requirement for the large-format internal picture memory.

A crucial part of contemporary video coding standards, such as, for example, the standards belonging to the H.26 or MPEG family, is so-called motion-compensated prediction. In this connection, the predecessor picture is in each case stored as a reference picture by the coder and the decoder, and only the differences with respect to the successor picture are transmitted, in order to reduce the coding extent. In addition, in accordance with the picture motion, blocks each comprising 16×16 pixels, for example, are displaced from the predecessor picture in order to ensure the best possible prediction of the successor picture.

In the decoding of HDTV signals which are to be reproduced on conventional screens, it is endeavoured, for cost reasons, not to use a reference picture memory for storing the individual pixels in the HDTV format, but rather merely a reference picture memory having a reduced storage capacity. In particular, the intention to use a reference picture memory which is only suitable for storing the picture data in the conventional SDTV format and, accordingly, has only a quarter of the storage capacity required for storing HDTV picture data. Different variants for compressing the reference pictures to be stored in the reference picture memory are known for this purpose and will be explained in more detail below with reference to FIG. 4.

FIG. 4 illustrates the basic construction of a TV or video decoder with motion-compensated prediction, as is used for example in digital TV sets. As has already been mentioned above, when using motion-compensated prediction, only the differences between two successive pictures are transmitted. In the case of the arrangement shown in FIG. 4, the difference values received in coded form are firstly fed to a variable length decoder 8, in order to convert the difference values into code words having uniform bit length. These code words are subsequently fed to a block 9 for carrying out an inverse quantization and a block 10 for carrying out an inverse discrete cosine transform (IDCT). In order to obtain the actual picture, the difference values are added to the values of the individual pixels of a reference picture which is stored in a reference picture memory 5 and correspond in particular to the preceding picture. Conversely, the pixel values of the instantaneous picture that are thus obtained, as shown in FIG. 4, are stored again in the reference picture memory 5, in order to store the instantaneous picture as a new reference picture.

Since, for cost reasons, the reference picture memory 5 is only configured for storing picture data in the conventional SDTV format, the picture data present downstream of the adder shown in FIG. 4 or the corresponding HDTV picture, must be compressed. In order to achieve this, the respective picture can be subsampled by a unit 1 for example with the factor ¼, with the result that the memory outlay for storing the HDTV picture compressed in this way is reduced. The picture data read from the reference picture memory 5 then have to be correspondingly decompressed by a unit 6 in order to obtain the original HDTV format again.

Generally, each picture is processed in blocks, and, by way of example, each block may comprise 16×16 pixels. In order to ensure the best possible prediction of the successor picture, blocks are displaced relative to the predecessor picture in accordance with the picture motion. For this reason, the picture data of the individual blocks that are read from the reference picture memory 5 are fed to a unit 7 for carrying out the motion compensation and for carrying out a corresponding interpolation. The principle of motion-compensated prediction is generally known in principle, and so it need not be discussed in more detail at this point.

Situated at the output of the video decoder shown in FIG. 4 is a switch 11, which can be used to effect a changeover between HDTV and SDTV picture reproduction. As has already been explained above, the picture data are present at the output of the adder shown in FIG. 4 (after the motion-compensated prediction explained above has been carried out) in the HDTV format. However, the desired SDTV format can be obtained from this with the aid of a subsampler 12, which subsamples the picture data or the corresponding pixels in accordance with the factor ¼.

With the aid of the subsampling of the HDTV picture carried out by the unit 1, as is described for example in H. Sun, "Hierarchical Decoder for MPEG Compressed Video Data", IEEE Trans. Consumer Electronics, Vol. 39, No. 3, 1993, pages 559-564, although the memory outlay required for storing the reference picture in the reference picture memory 5 can be reduced, the picture quality is nonetheless impaired on account of the reduced resolution. Instead of this subsampling in the space domain, subsampling in the frequency domain can also be carried out by the unit 1, as is described for example in A. W. Jonson, T. Sikora, T. K. Tan and K. N. Ngan, "Filters for Drift Reduction in Frequency Scalable Coding Schemes", ELECTRONIC LETTERS, 17 Mar. 1994, Vol. 30, No. 6, pages 471-472. However, a subsampling method of this type is not very suitable for detailed picture structures.

SUMMARY OF THE INVENTION

The present invention is therefore based on the object of providing a method and also a corresponding device for picture compression, a satisfactory picture quality being ensured even after the picture compression is carried out. In particular, the present invention is intended to be suitable for use in video coders or video decoders with motion-compensated prediction and to enable a significant reduction in the reference picture memory required for this purpose, in order to be able to store pictures that are present in the HDTV format, or the corresponding picture data, in the SDTV format, for example.

The abovementioned object is achieved according to the invention by means of a method having the features of claim 1 and, respectively, a device having the features of claim 22. The subclaims each define preferred and advantageous embodiments of the present invention.

The invention proposes subdividing a picture area to be compressed, which may correspond for example to a block having 16×16 pixels, into at least two layers which correspond to different sampling patterns. This subdivision corresponds to a multistage resolution pyramid. The pixels of the second layer are in this case predicted from the pixels of the first layer that have already been determined and, in particular, coded, and for this purpose it is possible to form, for each pixel of the second layer, for example, the mean from the corresponding four adjacent pixels of the first layer. The difference between the exact actual pixel value and the predicted pixel value obtained in this way, i.e. the prediction error, is coded and can be stored—for example when using motion-compensated prediction—in a reference picture memory.

This method can, in principle, be extended to an arbitrary number of layers, and the pixels of each subsequent layer can be predicted from the already determined pixels of the preceding layers. A Huffman coding with run length coding of the zeros is preferably suitable in each case for coding the prediction errors. Each layer or stage of this hierarchical layer model thus formed can be quantized independently, in which case, for each subsequent layer or stage, a coarser quantization is preferably chosen than that for the preceding layer, in order to avoid error propagation into the subsequent layers.

Subdividing the picture area to be compressed in accordance with a three-stage resolution pyramid has proved to be particularly advantageous, the first layer being obtained for example by subsampling, with the factor ¼, the picture area to be compressed and the prediction error determined for each pixel of this first layer preferably not being quantized, in order to avoid error propagation into the subsequent layers. The pixels of the second layer can also be obtained by subsampling the original picture area for example in accordance with the factor ¼. For the prediction errors of the pixels of this second layer it is advantageous to choose the quantization such that precisely the prediction errors of the first and second layers can be completely stored in the reference picture memory. The optimum quantization for this purpose can be determined by test codings. The pixels of the third layer that finally remain are not coded, in order to reduce the data rate, but rather predicted during decoding exclusively on the basis of the already coded pixels of the first and second layers. Experiments have shown that storing the pixels or the corresponding prediction errors of the first two layers already enables a very good picture quality.

As has already been mentioned above, a block having 16×16 pixels may in each case be used as the picture area to be compressed. Instead of this, however, the present invention can also be applied to a plurality of blocks arranged adjacent, for example, in a picture line, in order thus to be able to better compensate for differences in the event of sudden brightness or contrast changes in the picture. Particularly good results were able to be achieved for block groups which correspond to one quarter of a picture line.

As has likewise already been mentioned, the prediction can in each case be effected by forming the mean value. Instead of this, however, it is also possible, for example, to use the medium of the corresponding adjacent pixels. Equally, it is advantageous if an option for changing over between so-called "interlaced" coding and progressive coding is provided, since the "interlaced" coding is advantageous for TV pictures and the progressive coding is advantageous for cinema film pictures.

A special coding or compressing method is proposed with the aid of the present invention, involving, in particular, a scalable compressing method, which can also be referred to as a scalable DPCM method (Differential Pulse Code Modulation), and is suitable for the reconstruction of the original picture information with a sufficiently good resolution.

The present invention is suitable in particular for use in video coders or video decoders, such as, for example, MPEG-2 coders/decoders, in which the so-called motion-compensated prediction is employed. Furthermore, the present invention is suitable in particular for use in apparatuses which are configured to receive high resolution pictures but are intended to represent the pictures with a reduced resolution on a conventional screen in a reduced size (for example digital TV sets, set-top boxes for digital TV sets, video mobile telephones or the like). It goes without saying, however, that the present invention can generally be used wherever high-quality picture compression is desired.

The present invention is explained in more detail below using preferred exemplary embodiments with reference to the accompanying drawing.

DETAILED DESCRIPTION OF THE INVENTION

The invention employs a special compressing or coding method which compresses the picture to be compressed by a specific factor, for example by the factor 4, and, during decompression, allows any desired access to specific picture areas. The invention is explained below using the example of a video decoder with motion-compensated prediction, in particular using the example of a DCT hybrid decoder in accordance with the MPEG-2 standard, but the present invention can equally be applied to other predictive coding or decoding methods and compression factors and also other areas of application.

The compressing method of the present invention proposes subdividing the picture to be compressed into a plurality of areas, for example into blocks each having 16×16 pixels, which are compressed independently of one another in each case by the same factor, for example by the factor 4. The picture areas are subdivided into a plurality of layers which correspond to different sampling patterns of the respective picture area, the pixels of a subsequent layer in each case being predicted from the already coded pixels of the preceding layers and the difference between the exact and predicted pixel values, i.e. the prediction error, being coded and stored. This will be explained in more detail below with reference to FIG. 1.

Figure 1:
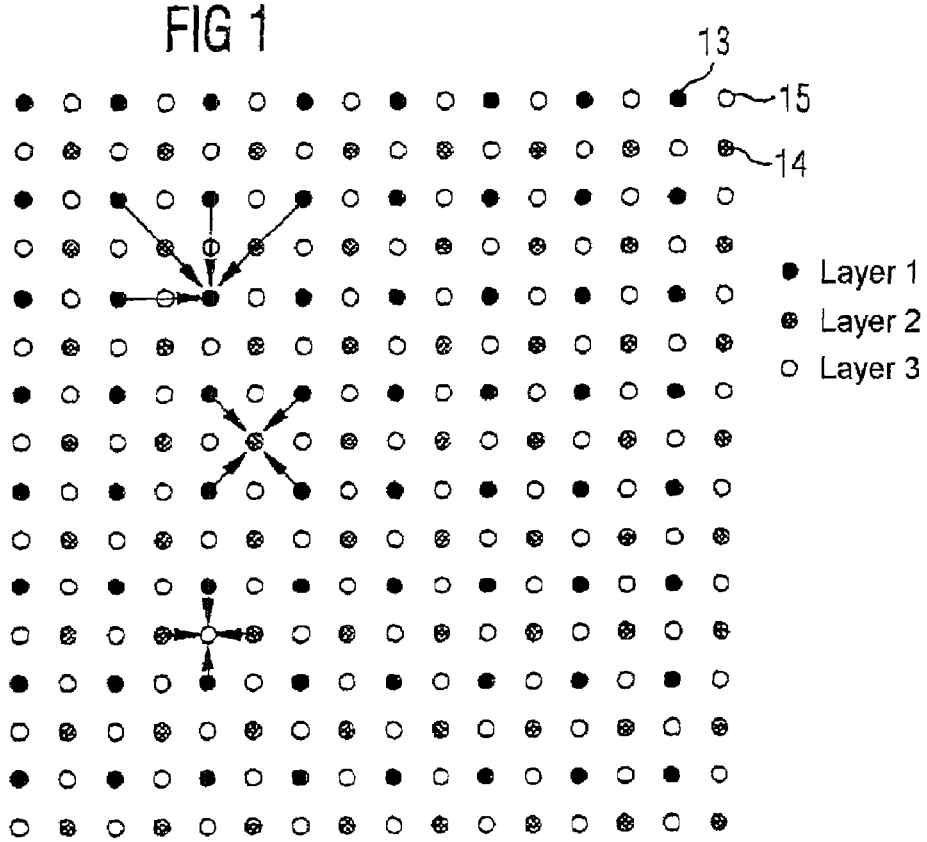
FIG. 1 shows the division of a picture area to be compressed into a plurality of layers in accordance with a preferred exemplary embodiment of the present invention.
Figure 3:
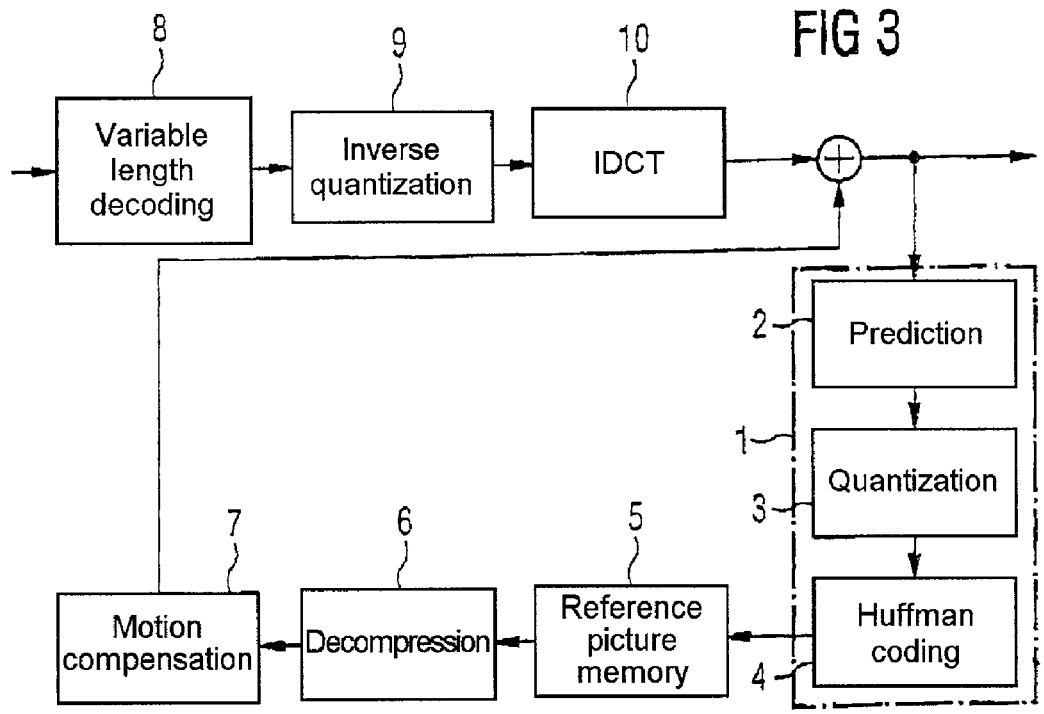
FIG. 3 shows a simplified block diagram of a video decoder according to the invention with motion-compensated prediction.
Figure 4:
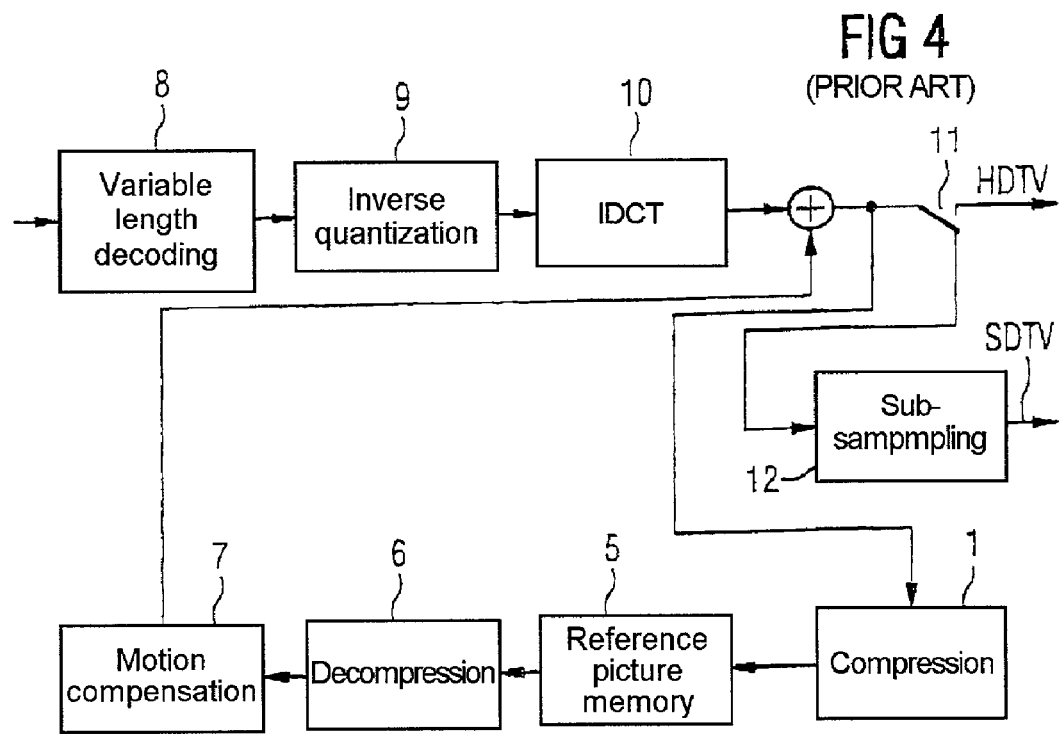
FIG. 4 shows a simplified block diagram of a video decoder according to the prior art with motion-compensating prediction.

FIG. 1 illustrates a picture area in the form of a block having 16×16 pixels which is to be compressed. This picture area is subdivided into three layers, which correspond to different sampling patterns. This subdivision corresponds to a three-stage resolution pyramid. As can be seen from FIG. 1, the values of the pixels 13 of the first layer are in each case predicted, i.e. estimated, from the already present pixel values of adjacent pixels of the same layer. The difference between the exact and predicted pixel values, i.e. the prediction error, is in each case coded and can be stored, for example, in the reference picture memory 5 shown in FIG. 3. In general, it should be noted that, in FIG. 3, the components corresponding to the components shown in FIG. 4 are provided with the same reference symbols and, with regard to these components, reference is made to the above description concerning FIG. 4, in order to avoid repeating the description.

A Huffman coding with run length coding of the zeros is preferably suitable for coding the prediction error. The Huffman tables used for the Huffman coding must be specifically adapted to the statistics of highly detailed picture contents, since these are the most susceptible to errors.

As can additionally be seen from FIG. 1, the values of the pixels 14 of the second layer are determined from the adjacent pixels 13 of the first layer, which pixels are thus already present in coded form. With regard to the pixels 14 of the second layer, too, in each case the difference between the exact pixel value and the predicted pixel value, i.e. the prediction error, is determined, coded and stored.

The method described above can, in principle, be extended to an arbitrary number of layers, in each case the pixels of a layer being predicted from the already coded adjacent pixels of the preceding layer or of the preceding layers and the prediction error being coded. In this case, it is advantageous to output the coded difference values in each case in quantized form, a layer-specific quantization being chosen for each layer in such a way that, in order to avoid propagation of errors, a finer quantization is chosen for the lower layers, i.e. for the layers processed earlier, than for the upper layers, i.e. the subsequent layers.

In the exemplary embodiment shown in FIG. 1, each pixel value is predicted from four adjacent pixels. In order to accelerate the method, however, a different number of adjacent pixels, for example two adjacent pixels, can also be chosen for the prediction of a pixel. This variant would only slightly reduce the compression efficiency.

Furthermore, the mean values of the adjacent pixels may in each case serve as predictors. Equally, however, it is also conceivable to use the median, the adjacent pixels from which the respective pixel is to be predicted being ordered according to their value and the middle value in the series of adjacent pixels thus ordered being chosen for the pixel to be predicted.

As has already been mentioned above, the individual layers are processed, i.e. predicted, coded and quantized, separately from one another. In this case, it is advantageous to carry out the coding layer by layer until the predetermined overall compression factor has been reached, i.e. the available memory space of the reference picture memory 5 has been filled. The subsequent pixels or symbols that are still to be processed are not stored, but rather, during the decoding performed by the decompression unit 6 shown in FIG. 3, are merely predicted from the coded pixel or prediction error values stored in the reference picture memory 5. In this case, it is advantageous to choose the coding and quantization of the first and second layers such that, taking account of the still available memory space of the reference picture memory 5, the second layer, too, can still be coded. In order to achieve this, it is possible to dispense with quantization for the first layer, in order to avoid error propagation into the subsequent layers. The quantization interval for the second layer is finally chosen such that the second layer is still coded. The optimum quantization required for this purpose can be determined by variation and test codings. After the coding and quantization of the first and second layers, the reference picture memory 5 is full. In order to reduce the data rate, the pixels 15 of the third layer are thus not coded, but rather, during decoding, are predicted exclusively on the basis of the values of the adjacent pixels of the preceding layers, which values are stored in the reference picture memory 5. Experiments have shown that coding and storing the pixels 13, 14 of the first two layers already enables a very good picture quality.

As is shown in FIG. 3, for carrying out the method described above, the compression unit 1, which is provided for compressing the desired picture area, is to be equipped with a unit 2, which subdivides the picture area to be compressed into the individual layers and, for the individual layers, performs the prediction of the pixel values from the corresponding adjacent pixels and outputs the prediction error for each predicted pixel. Furthermore, the compression unit 1 comprises a quantization unit 3, which carries out the abovementioned layer-specific quantization of the prediction errors of the individual pixels. Finally, the compression unit 1 also comprises a coding unit 4 for coding the quantized prediction errors, in particular a Huffman coding with run length coding of the zeros being carried out. The code symbols quantized in this way are stored in the reference picture memory 5. The decompression unit 6 connected downstream of the reference picture memory 5 is constructed in a manner corresponding to the compression unit 1 and, accordingly, comprises a dequantization unit, a deprediction unit and a decoding unit. The picture data are thus obtained in the original picture format, for example in the HDTV format, from the decompression unit 6 and fed to the motion compensation unit 7.

Figure 2:
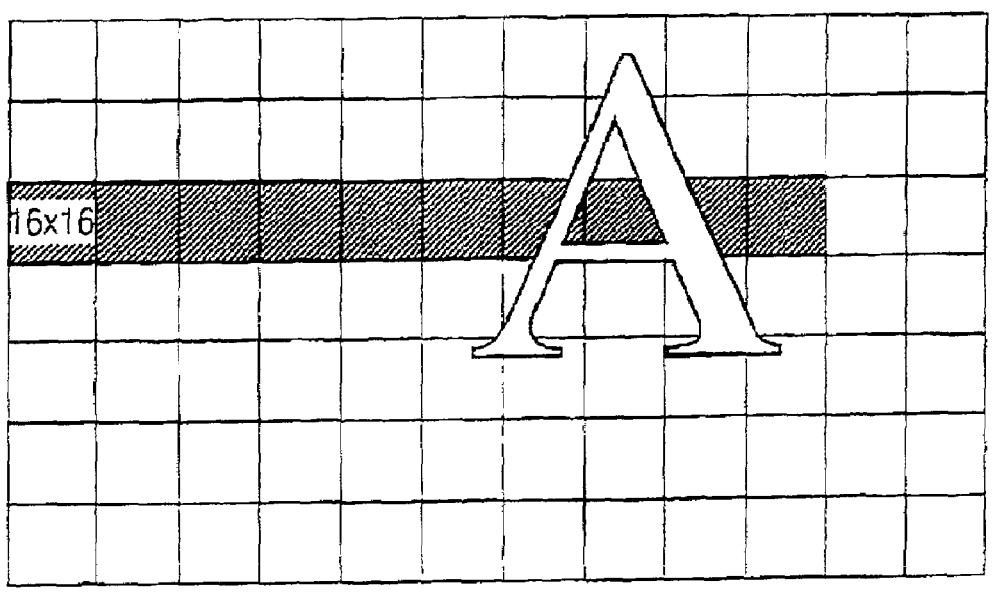
FIG. 2 shows a representation for illustrating the application of the present invention to a plurality of adjacent blocks in a picture line.

In the above description, it was assumed that the compression unit 1 in each case processes individual blocks having 16×16 pixels. However, the average picture quality becomes better, the larger the coding areas are chosen to be, since the data rate can be compensated within coding areas. If the coding areas are chosen to be too large, however, memory space is wasted for uncoded storage. As an optimum solution, it is recommended to choose for the coding area a macroblock line having a plurality of adjacent blocks which can correspond to one quarter to one whole picture line. Such a macroblock line is illustrated in FIG. 2. The above-described method according to the invention is thus applied to the entire macroblock line as a unit, i.e. the entire macroblock line is subdivided into the three layers, which are processed in the manner described above. Using this approach, it is possible to process highly detailed picture areas, which are indicated by the letter "A" in FIG. 2, at a higher data rate, which can be reduced in homogeneous picture areas.

In the exemplary embodiment shown in FIG. 1, it is assumed that the individual lines of a picture area to be processed are processed one after the other, i.e. progressively. This procedure is suitable for example for cinema film pictures, which are progressively coded. By contrast, TV pictures are generally coded in "interlaced" fashion, i.e., for example, the even-numbered lines are processed first before the odd-numbered lines are processed. Even when the present invention is employed, it is possible to provide a corresponding "interlaced" processing, i.e. the even-numbered lines and the odd-numbered lines are processed separately from one another. It is particularly advantageous if the arrangement shown in FIG. 3 is configured in such a way that a changeover can be made between an "interlaced" coding and a progressive coding, in order to select the type of processing or coding that is best suited, depending on the picture source respectively used.

In this case, the compression mode that is best suited can also be automatically determined in that, for each block to be processed or for each macroblock line to be processed, both an "interlaced" coding and a progressive coding are carried out and then the most effective compression mode is actually realized automatically.

Consequently, in the context of the present invention, a finely granularly scalable compression or coding scheme is proposed which can be terminated at any desired point in the bit stream to be compressed and nevertheless outputs a realistic picture, although one with reduced resolution.

The invention claimed is:

1. Method for compressing a picture area having a plurality of pixels described by corresponding pixel values, comprising the steps of:
   subdividing the picture area to be compressed into at least a first sampling pattern and a second sampling pattern, the first and second sampling patterns being subsampled from the picture area, wherein the first and second sampling patterns include different pixels of the picture area to be compressed;
   coding the pixels of the first sampling pattern;
   after the coding step, determining a predicted pixel value and coding each pixel of the second sampling pattern from pixel values of the coded pixels of the first sampling pattern that are adjacent to the respective pixel of the second sampling pattern in the picture area; and
   outputting a difference value between the predicted pixel value and an actual pixel value of the respective pixel of the second sampling pattern.

2. Method according to claim 1, characterized in that a predicted pixel value is determined for the pixels of the first sampling pattern from pixels of the first sampling pattern that are adjacent in the picture area, and the difference value between the predicted pixel value and the actual pixel value of the respective pixel is output for further processing.

3. Method according to claim 2, characterized in that the difference values determined for the pixels of the first sampling pattern are output in unquantized form for further processing.

4. Method according to claim 2, characterized in that the difference values determined for the pixels of the first and second sampling patterns are coded.

5. Method according to claim 2, characterized
   in that the picture to be compressed is subdivided into the first and the second and also a third sampling pattern, the first, second and the third sampling pattern corresponding to different sampling patterns of the picture area,
   in that a predicted pixel value is determined for each pixel of the third sampling pattern from pixel values of pixels of the first and second sampling patterns that are adjacent to the respective pixel in the picture area, and is output for further processing, and
   in that the predicted pixel value is determined for each pixel of the third sampling pattern from the difference values which have been determined for pixels of the first and second sampling patterns that are adjacent to the respective pixel in the picture area, and is output for further processing.

6. Method according to claim 1, characterized in that the first sampling pattern is obtained by subsampling, with a factor ¼, the picture area to be compressed.

7. Method according to claim 1, characterized in that the second sampling pattern is obtained by subsampling, with a factor ¼, the picture area to be compressed.

8. Method according to claim 1, characterized in that the difference values determined for the pixels of the second sampling pattern are quantized before they are output for further processing.

9. Method according to claim 1, characterized
   in that the picture to be compressed is subdivided into the first and the second and also a third sampling pattern, the first, second and the third sampling patterns corresponding to different sampling patterns of the picture area, and
   in that a predicted pixel value is determined for each pixel of the third sampling pattern from pixel values of pixels of the first and second sampling patterns that are adjacent to the respective pixel in the picture area, and is output for further processing.

10. Method according to claim 1, characterized
    in that the picture area to be compressed is subdivided into a plurality of sampling patterns which correspond to different sampling patterns of the picture area and form a specific sampling pattern sequence, and
    in that a predicted pixel value is determined for each pixel of a sampling pattern from pixel values of pixels of preceding sampling patterns in the sampling pattern sequence, which pixels are adjacent to the respective pixel in the picture area, and the difference value between the predicted pixel value and the actual pixel value of the respective pixel is output for further processing.

11. Method according to claim 10, characterized in that, for each sampling pattern, a quantization of the difference values determined for the corresponding pixels of said sampling pattern is carried out, the quantization in each case being coarser than that for the preceding sampling patterns in the sampling pattern sequence.

12. The method as claimed in claim 10, characterized in that the difference value determined for a pixel is output in coded form for further processing.

13. Method according to claim 12, characterized in that the coding carried out is a Huffman coding.

14. Method according to claim 1, characterized in that, in order to determine the predicted pixel value of a pixel, in each case two or four pixels arranged adjacent to the respective pixel in the picture area to be compressed are used.

15. Method according to claim 1, characterized in that the predicted pixel value is determined by forming the mean value or median value of the corresponding adjacent pixels.

16. Method according to claim 1, characterized in that the picture area used is in each case a picture area having 16×16 pixels.

17. Method according to claim 1, characterized in that the picture area used is in each case a group of a plurality of picture blocks arranged next to one another in a picture line of a picture to be compressed.

18. Method according to claim 17, characterized in that the group of picture blocks arranged next to one another corresponds to one quarter to one whole picture line of the picture to be compressed.

19. Method according to claim 1, characterized in that the picture area to be compressed is processed in a progressive manner in accordance with the picture compression method.

20. Method according to claim 19, characterized
    in that the picture area to be compressed is processed in an interlaced manner in accordance with the picture compression, and
    in that a changeover is made between progressive processing and interlaced processing in a manner dependent on the picture source of the picture area to be compressed.

21. Method according to claim 19, characterized
    in that the picture area to be compressed is processed in an interlaced manner in accordance with the picture compression, and
    in that both progressive processing and interlaced processing are carried out for the picture area to be compressed and the more effective type of processing is subsequently selected.

22. Method according to claim 1, characterized in that the picture area to be compressed is processed in an interlaced manner in accordance with the picture compression.

23. Device for picture compression, comprising:

a digital picture signal which describes corresponding pixel values of a picture area that is to be compressed and includes a plurality of pixels, wherein the digital picture signal is fed to subsampling means for subdividing the picture area to be compressed into at least a first sampling pattern and a second sampling pattern, the first and second sampling patterns being subsampled from the picture area, wherein the first and second sampling patterns include different pixels of the picture area to be compressed;

means for coding the pixels of the first sampling pattern;

prediction means for determining a predicted pixel value and coding each pixel of the second sampling pattern from pixel values of the coded pixels of the first sampling pattern that are adjacent to the respective pixel of the second sampling pattern in the picture area to be compressed, and for outputting a difference value between the predicted pixel value and an actual pixel value of the respective pixel of the second sampling pattern; and means for coding pixels of at least one additional sampling pattern based on the coded pixels of preceding sampling patterns and the outputted difference values.

24. Device according to claim 23, further comprising means for coding the difference values output by the prediction means.

25. Device according to claim 24, wherein the means for coding the difference values are configured for carrying out a Huffman coding of the difference values output by the prediction means.

26. Device according to claim 23, characterized in that quantization means are provided for quantizing the difference values output by the prediction means.

\* \* \* \* \*